United States Patent
Gerrits

(10) Patent No.: US 7,529,005 B2
(45) Date of Patent: May 5, 2009

(54) METHOD FOR PROCESSING A MULTI-COLOUR IMAGE

(75) Inventor: Carolus E. P. Gerrits, Velden (NL)

(73) Assignee: OCE-Technologies B.V., Venlo (NL)

( * ) Notice: Subject to any disclaimer, the term of this patent is extended or adjusted under 35 U.S.C. 154(b) by 758 days.

(21) Appl. No.: 11/069,714

(22) Filed: Mar. 2, 2005

(65) Prior Publication Data
US 2005/0195418 A1    Sep. 8, 2005

(30) Foreign Application Priority Data
Mar. 3, 2004    (EP) .................... 04075680

(51) Int. Cl.
G03F 3/08    (2006.01)
(52) U.S. Cl. .............. 358/518; 382/167; 358/1.9; 358/502; 347/115; 345/76; 345/590
(58) Field of Classification Search .......... 358/515, 358/518–521, 1.9
See application file for complete search history.

(56) References Cited

U.S. PATENT DOCUMENTS

| 5,563,724 | A | * | 10/1996 | Boll et al. ............... 358/502 |
| 5,745,120 | A | * | 4/1998 | De Baer et al. ........... 345/590 |
| 6,014,457 | A | * | 1/2000 | Kubo et al. .............. 382/167 |
| 6,352,806 | B1 | | 3/2002 | Dalal | |
| 2002/0113982 | A1 | * | 8/2002 | Chang et al. ............ 358/1.9 |
| 2004/0021886 | A1 | * | 2/2004 | Boesten ................. 358/1.9 |

FOREIGN PATENT DOCUMENTS

| EP | 0 373 704 A1 | 8/1989 |
| EP | 0 741 490 A1 | 11/1996 |
| EP | 0 982 932 A3 | 3/2000 |
| EP | 1 237 355 A2 | 9/2002 |

OTHER PUBLICATIONS

Victor Ostromoukhov, "Chromaticity gamut enhancement by heptatone multi-color printing" IS&T/SPIE 1993 International Symposium on Electronic Imaging: Science & Technology, Jan. 31-Feb. 4, 1993, San Jose, California, USA., Proceedings Conf. Device-Independent Color Imaging and Imaging Systems Integration, SPIE vol. 1909, pp. 139-151.

Victor Ostromoukhov; Chromaticity gamut enhancement by heptatone multi-color printing, SPIE, vol. 1909, pp. 139-151. Feb. 1993.

* cited by examiner

*Primary Examiner*—Mark K Zimmerman
*Assistant Examiner*—Dung D Tran
(74) *Attorney, Agent, or Firm*—Birch, Stewart, Kolasch & Birch, LLP

(57) ABSTRACT

A method is provided for processing digital multi-color images for the reproduction thereof on a color printing and/or copying system provided with a plurality of process colors defining a gamut. According to this method the gamut is divided into multiple non-overlapping sub-gamuts, each defined by three chromatic process colors. For each pixel of the digital multi-color image, a single corresponding sub-gamut is selected based on lightness differences between the respective chromatic process colors.

19 Claims, 2 Drawing Sheets

METHOD FOR PROCESSING A MULTI-COLOUR IMAGE

This application claims the priority benefit of European Patent Application No. 04075680.1 filed on Mar. 3, 2004, which is hereby incorporated by reference.

BACKGROUND OF THE INVENTION

1. Field of the Invention

The present invention is related to the processing of multi-colour images for reproduction in a printing or copying system provided with at least five process colours. Particularly of interest are complementary multi-colour printing or copying systems.

2. Discussion of the Related Art

Hereinafter, reference will be made to a multi-colour reproduction system being a multi-colour printing and/or copying system. In this disclosure, colour means all colours including black and white and all shades of grey. In digital colour printing, continuous tones are rendered by halftoning the separation images in the process colours. The process colours are a limited number of colours of marking particles available on the multi-colour image reproduction system to render a colour image.

Usually a distinction can be made among colour printing systems based on the kind of marking particles used, e.g. ink or toner, the imaging process employed, e.g. magnetography, or electro(photo)graphy, or inkjet, the productivity or the media range. A distinction can however also be made depending on the available number of process colours. The process colours correspond to the colours of the respective coloured marking particles available in the system such as e.g. black, white, cyan, magenta, yellow, orange, pink, red, green and blue. By selecting a number of process colours for a colour image reproduction system, one fixes the range of colours which can be produced by the colour image reproduction system, or in other words the gamut.

Most image reproduction systems employ the three classic chromatic colours: cyan (C), magenta (M) and yellow (Y), i.e. the so-called subtractive colours, and in most cases additionally black (K). The achievable gamut with the process colours cyan, magenta, yellow and black is usually more restricted than the gamut of the image to be reproduced. To extend the gamut, more process colours need to be added. Typical process colour sets existing nowadays include sets of cyan, magenta, yellow and red, or of cyan, magenta, yellow, orange and green, or of the subtractive colours and red (R), green (G) and blue (B), the so-called additive colours, to extend the gamut respectively in the red, green and blue colours. To each of the afore-mentioned sets, the process colour black may be added.

A further distinction can be made depending on how the multi-colour image of marking particles is composed. For instance, the multi-colour image of marking particles may be composed of a plurality of registered colour separation images where the marking particles of the respective process colours associated with the respective colour separation images are superimposed by the multi-colour image reproduction system, hereinafter referred to as a superimposed multi-colour image reproduction system.

Alternatively, the multi-colour image of marking particles may be composed of a plurality of registered colour separation images where the marking particles of the respective colours associated with the respective colour separation images are positioned contiguous to each other by the multi-colour image reproduction system, hereinafter referred to as a complementary multi-colour image reproduction system. In such a system, the digital images are first decomposed into a selection of process colours of the system yielding a number of digital colour separation images. The respective digital colour separation images are complementary and sequentially converted in register into colour separation images of marking particles of the respective associated colour on an image-receiving member so as to form registered composite multi-colour images of coloured marking particles thereon. Complementary means that marking particles of a process colour are accumulated on the free surface of the image-carrying member and substantially not on coloured marking particles already accumulated on the image-receiving member.

When reproducing colour images, and particularly contone images, these images are processed by the colour image reproduction system such as to generate digital colour separation images in the process colours. The respective digital colour separation images are halftoned for enabling printing. Usually each colour separation image is halftoned using a different screen. A disadvantage of this approach employing a plurality of different screens is its sensitivity for creating Moiré patterns. Moiré patterns are visible distortions in a rendered multi-colour image caused by interference patterns generated by combining halftone screens. Although it is known that the visible effect of Moiré patterns can be reduced by angling the halftone screens using predetermined screen angles, avoiding Moiré, becomes particularly troublesome in colour image reproduction systems where four or more process colours can be printed. Thus in order to avoid Moiré the number of screens should be limited. To meet this requirement, nowadays multi-colour image reproduction systems provided with the process colours yellow, magenta, cyan, red, green, blue and black exist wherein colour images are printed using the approach for instance as disclosed by Victor Ostromoukhov in "Chromaticity gamut enhancement by heptatone multi-color printing", SPIE Proceedings 1993, Vol. 1909, pp. 139-151. According to this approach each pixel of a colour image is printed using a selection of at most three out of seven process colours, namely two chromatic colours: one additive primary colour (one of RGB) and one subtractive secondary colour (one of YMC) and an achromatic colour: black (K). As a consequence, in the heptatone printing process as disclosed by Ostromoukhov, the available gamut is divided in six sub-gamuts: KRY, KRM, KBM, KBC, KGC and KGY.

A first disadvantage of the approach by Ostromoukhov, however, is that a grey tone can only be printed with dots of black marking particles and thus, particularly at low image densities, the printed images are highly sensitive to graininess. Graininess is a perceived feature of a rendered colour which is among others related to how uniformly the coloured marking particles have been formed on the medium. Apart from image coverage, lightness differences and particularly unintentional variations in lightness differences determine to a large extent the amount of graininess. The higher the lightness differences are the more sensitive the printed images are with respect to graininess. Lightness differences include differences in lightness between non-overlapping dots of marking particles of different process colours, and in case superimposed multi-colour image reproduction systems are used, differences in lightness between non-overlapping dots of superimposed marking particles of different process colours.

A further disadvantage of the approach disclosed by Ostromoukhov is that each sub-gamut comprises only two chromatic process colours and thus a coloured pixel can only be printed with at most two process colours. Besides that the availability of only two chromatic process colours negatively affects graininess at low image densities, this also limits the ability for faithful colour reproduction of for instance photos and particularly e.g. image parts of light shades of pastel colours.

SUMMARY OF THE INVENTION

Accordingly, it is an object of the invention to provide a method for processing multi-colour images for the reproduction thereof on a complementary colour image reproduction system provided with at least five process colours with no or at least a limited sensitivity for graininess, particularly at low image densities.

It is a further object of the present invention to provide a method for processing digital multi-colour images for the reproduction thereof on a colour image reproduction system provided with at least five process colours, wherein each pixel of the multi-colour images is rendered using up to three chromatic process colours while avoiding or at least limiting Moiré.

It is another object of the invention to provide a method, system and computer software for processing digital multi-colour images, which overcome the limitations and disadvantages associated with the related art.

In an aspect of the invention, a method is disclosed for processing a digital multi-colour image for reproduction thereof on a complementary colour image reproduction system provided with at least five process colours defining a gamut, the method comprising the steps (a) to (d).

In the step (a), the available gamut is divided into a plurality of sub-gamuts, each sub-gamut being defined by three chromatic process colours of the plurality of process colours, such that at least one sub-gamut of the plurality of sub-gamuts comprises complementary process colours. Complementary colours are colours which when combined form an achromatic colour. Typical examples of complementary colours are C and R, G and M, and Y and B. The available gamut is the gamut defined by all available process colours and may include chromatic as well as achromatic process colours. The achromatic colours are black, white and all shades of grey. In other words, these are all colours positioned substantially on the grey axis being the line connecting the white point with the black point. Each sub-gamut is defined by three chromatic process colours; however, it is understood that additional achromatic process colours may be added to the set of process colours defining the sub-gamut.

According to the invention, the gamut is divided such that at least one sub-gamut is obtained to be defined by three chromatic colours, two of them being complementary colours, which is one of the unique features of the invention since most commercially available multi-colour image reproduction systems are superimposed multi-colour image reproduction systems. In such systems there is no incentive whatsoever to create a sub-gamut defined by a set of 3 chromatic process colours, where two of these process colours are complementary colours. When coloured pixels, positioned within such sub-gamut and having a contribution in each of the three process colours, are printed, three dots of marking particles of the respective colours are formed on top of each other. The dots of complementary colours formed on top of each other are known to combine into a darkish achromatic tone, in other words, the composite colour obtained has a low lightness value. This is detrimental with respect to graininess.

The multi-colour image reproduction system according to the present invention is a complementary multi-colour image reproduction system. In the latter system, dots of marking particles of the respective colours are positioned contiguous to each other. In such system composite colours can be obtained solely perceptually as the human eye integrates the dot patterns formed in the respective process colours, thus no physically composite colours can be obtained as in a superimposed image reproduction system. Although the prejudice not to create sub-gamuts with complementary colours can be set aside when using a complementary image reproduction system, there is still no incentive to do so. After due experimentation, it is however observed that this has some very important advantages. A first advantage is that a grey tone can be rendered without using an achromatic process colour such as black. Particularly at low image densities, avoiding the black process colour when printing contone images is beneficial with respect to graininess. A further advantage is that a grey tone can be rendered in a more stable manner as only two process colours are required instead of three as is for instance the case in a CMY gamut. Still a further advantage is that a coloured pixel can now be reproduced using up to three chromatic process colours which enables the faithful reproduction of contone images, particularly photos, having image parts with e.g. light shades of pastel colours or the light human skin colour.

In the step (b), two complementary chromatic process colours from the at least five process colours are selected. Typically a set of complementary process colours is selected which seems to be the most appropriate to adequately reproduce a grey tone without using an achromatic process colour. Then, for each sub-gamut comprising the selected complementary process colours, an associated first lightness value, which is the maximum of the lightness differences between the respective chromatic process colours defining the sub-gamut, is determined. Subsequently, all sub-gamuts comprising the selected complementary process colours are ordered with increasing first lightness value, and based on this order each of the respective chromatic process colours is associated with a single one of three different screens. Employing the complementary multi-colour image reproduction system according to the present invention, no physically composite colours can be created and thus the lightness differences of composite colours do not contribute to graininess, but the graininess is primarily determined by the lightness differences between the respective process colours printed. Moreover by uniquely associating each process colour with a screen it is assured that the same chromatic process colour can always be rendered with the same associated screen irrespective of the selected sub-gamut. As only three screens are required, optionally four if the black process colour is added to the available process colours, Moiré can be prevented or at least seriously limited with known measures such as for instance by using predetermined screen angles.

In the step (c), for each sub-gamut of the plurality of sub-gamuts an associated second lightness value, which is the lightness difference in a predetermined colour space between the two chromatic process colours of the sub-gamut defining the plane positioned closest to the lightness axis, is determined. The two chromatic process colours of a sub-gamut defining the plane positioned closest to the lightness axis or if more appropriate to the grey axis are the two process colours of that sub-gamut which will be used to print tones closest to the lightness axis or the grey axis. In case these two process colours are complementary colours the grey tone can be rendered faithfully; if these process colours are not complementary, then the grey tone can not exactly be reproduced but these process colours are still the best choice to approach the grey tone as good as possible.

In the step (d), for each pixel of the digital multi-colour image the sub-gamuts which can be used for rendering the pixel are determined. Among these sub-gamuts, one sub-gamut with the lowest associated second lightness value is selected and the pixel is rendered with at most three chromatic process colours of the three chromatic process colours defining the selected sub-gamut. An advantage of this approach is that a grey tone will always be rendered in the most stable manner with the lowest possible sensitivity with respect to graininess.

According to the present invention, all sub-gamuts comprising the selected complementary process colours are ordered according to the increasing lightness value, and based on this order each of the respective chromatic process colours is associated with a single one of three different screens. In an embodiment of the invention, this association is done based on the criterion that each chromatic process colour of the sub-gamut or of each sub-gamut is to be associated with a different one of the three screens available. This is done for avoiding that the same screen is used for two different chromatic process colours within the or each sub-gamut. As each chromatic process colour is uniquely associated with a screen, a practical consequence is that sub-gamuts which can not satisfy this criterion are excluded and can not be selected to render a coloured pixel. Moreover, in associating the respective chromatic process colours with the respective screens, it is observed to be advantageous to associate chromatic process colours being positioned adjacent to each other in a predetermined colour space with a different screen. Doing so prevents that sub-gamuts comprising adjacent chromatic process colours are already excluded on the basis of the afore-mentioned criterion.

In accordance with an aspect of the present invention, complementary process colours are screened with a different screening angle. This is advantageous for the stable rendering of grey tones.

In accordance with an aspect of the present invention, the complementary colour image reproduction system is provided with six chromatic colours, being red, green, blue, cyan, magenta and yellow. Preferably, according to the present invention, the selected complementary process colours are cyan and red.

In accordance with yet another aspect of the present invention, each sub-gamut is defined by at least one additive primary process colour and at least one subtractive secondary process colour.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

In relation to the appended drawings, the present invention is described in detail below. Several exemplary embodiments are disclosed. It is apparent however that a person skilled in the art can imagine other equivalent embodiments or other ways of executing the present invention, the scope of the present invention being limited only by the terms of the appended claims.

Figure 1:
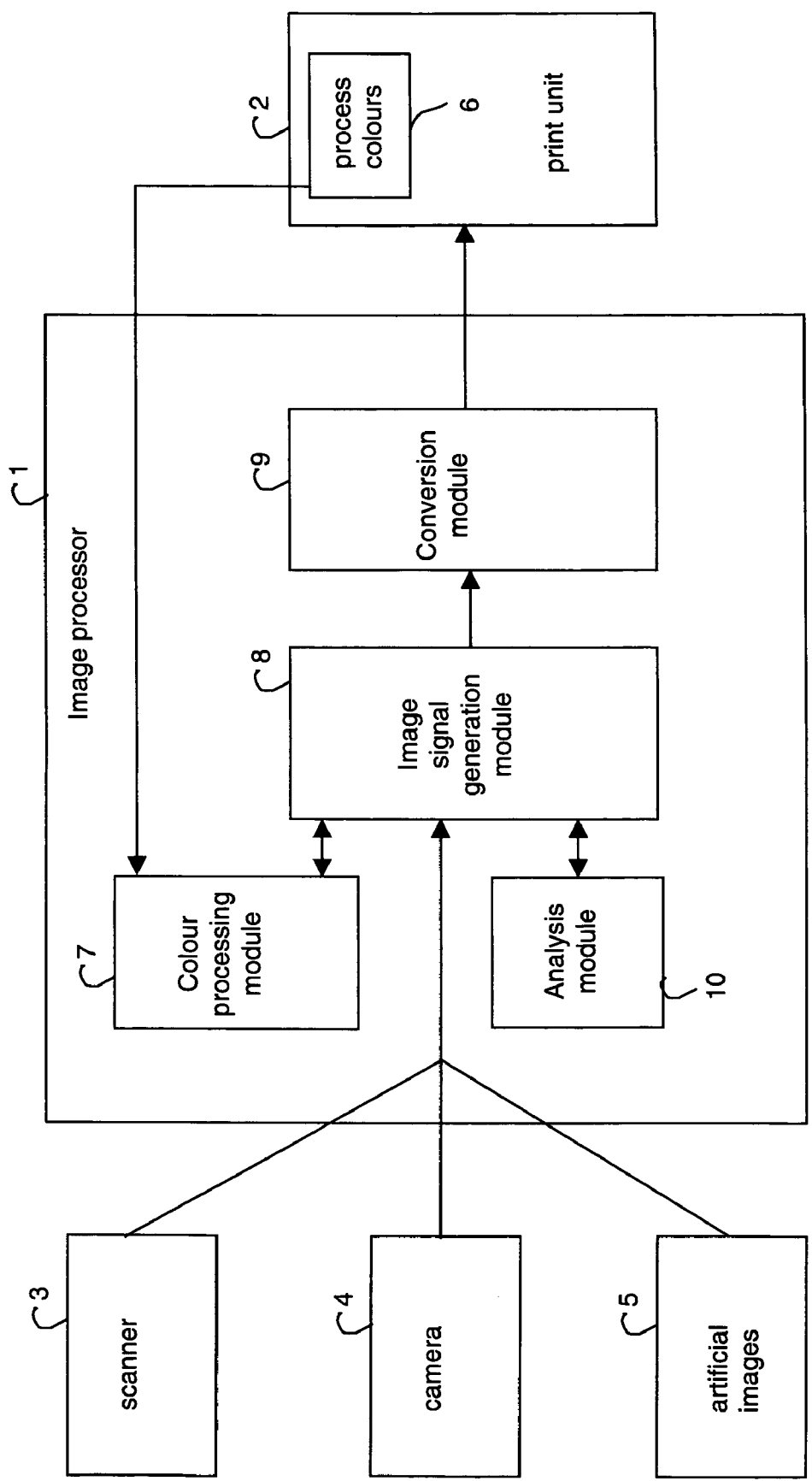
FIG. 1 depicts a schematic representation of a colour image reproduction system according to the present invention.

According to an embodiment of the invention, a digital image reproduction system as depicted in FIG. 1 comprises an image processing system (1) and a printing unit (2), all operatively coupled. A digital multi-colour image may be offered to the digital image reproduction system for reproduction thereof. There are numerous ways to generate a digital image. For instance, a digital image may be generated by scanning an original document using a scanner (3). The scanner can be part of the digital image reproduction system or may be coupled via a network or any other interface to the digital image reproduction system. Digital still images may also be generated by a camera or a video camera (4) which may be coupled via a network or any other interface, e.g. an IEEE1394 interface, to the digital image reproduction system. Besides digital images generated by a scanner or a camera, which are usually in a bitmap format or a compressed bitmap format also artificially created, e.g. by a computer program, digital images or documents (5) may be offered to the digital image reproduction system. The latter images are usually in a structured format including but not limited to a page description language (PDL) format and an extensible markup language (XML) format. Examples of a PDL format are PDF (Adobe), PostScript (Adobe), and PCL (Hewlett-Packard). A method of the present invention is also discussed below referring to FIG. 2.

Regardless of the origin of the digital image, one may opt to store the digital image in a memory such that it can be easily retrieved by the image processing system either directly or via any interface.

The image processing system (1) includes a colour processing module (7), an image signal generation module (8), a conversion module (9), and an analysis module (10), all operatively coupled.

The colour gamut that can be rendered by the digital image reproduction system depends on the number of process colours (6) available and their respective colour values. The process colours (6) correspond to the colours of the marking particles available in the printing unit (2). Although the invention is clearly not limited thereto, suppose only as an example that the process colours (6) available in the printing unit (2) are the additive colours Red, Green, Blue, the subtractive colours Cyan, Magenta and Yellow and the achromatic colour black. The maximum achievable colour gamut is the colour gamut defined by all the available process colours. According to the present invention, the colour processing module (7) divides the colour gamut achievable with these seven process colours on the digital image reproduction system into all obtainable sub-gamuts defined by three chromatic process colours.

Further according to the present invention, as will be explained in more detail later, the total number of sub-gamuts is subsequently reduced to multiple sub-gamuts. These remaining sub-gamuts may be, at least partially, overlapping. This means that points in a predetermined colour space may be contained in plural sub-gamuts. The colour processing module (7) determines for each such point the corresponding sub-gamut by selecting one of these plural sub-gamuts based on the second lightness value. The second lightness value is the lightness difference in a predetermined colour space between the two chromatic process colours of a sub-gamut defining a plane positioned closest to the lightness axis or alternately the grey axis.

The black process colour may be added to each of the remaining sub-gamuts. With known techniques, a colour management system (not shown) may be used to match each pixel of a digital image with a point in the predetermined colour space. Thus each pixel can be rendered using up to three out of the six available chromatic process colours and optionally black. By doing so, the maximum number of process colours usable to render a pixel of a digital image is reduced to three, optionally four, without restricting the colour gamut of the digital image reproduction system. Whether or not the black process colour is added to the three process colours defining a sub-gamut depends on the image area coverage of the digital image which is determined by the analysis module (10).

The image signal generation module (8) of the image processing system generates a sequence of image signals for the process colours (6). Each image signal has a one-to-one relationship with a separation image of a particular process colour. The image signal specifies at least an image density value for the associated process colour for each pixel of the digital image. The image density value for the associated process colour for a pixel of the digital image is zero if that associated process colour is not part of the sub-gamut which is selected for that pixel by the colour processing module (7). An image density value is typically an 8-bit value which enables the use of 256 grey levels per process colour, but can have a different size. The pixel size is usually the same for each process colour and, although not required, is usually chosen or tuned such that the pixel size corresponds to the image dot size of the printing unit. Preferably the sequence wherein the image signals are generated corresponds to the sequence wherein the separation images of coloured marking particles are formed by the printing unit.

The conversion module (9) converts the sequence of image signals by means of a halftone technique into a sequence of corresponding printing signals. Each printing signal indicates for each associated process colour for each pixel of the digital image whether an image dot of marking particles of that process colour is to be formed. This indication may be done using a single bit or multi-bit value depending on the halftoning capabilities of the printing unit. If the printing unit is capable of multi-level halftoning, a multi-bit value may be used, where the number of bits relates to the number of grey levels which can be reproduced per image dot of marking particles by the printing unit. Usually the printing unit is only capable of binary halftoning or in other words a single bit value, i.e. "0" or "1" indicating whether an image dot is to be formed or not. In principle, the image signals may be converted into printing signals by any halftone technique.

Examples of halftoning techniques are matrix-dithering, stochastic dithering, and error-diffusion or any combination thereof. Matrix dithering produces a screen of pixels arranged in a regular matrix structure of several different threshold values. In particular, a printing signal is built up from a screen of a two-dimensional matrix structure including threshold values being arranged in a predetermined order by comparing the image density value for the associated process colour for each pixel of the digital image with the corresponding threshold value. When employing stochastic dithering, the threshold values are arranged randomly. In error diffusion, the image density value for a process colour for a pixel is compared with a threshold value. The difference between these two values is distributed over the neighbouring pixels. The sequence of printing signals preferably corresponds to the sequence wherein the respective process colours are applied by the printing unit during image reproduction.

The printing unit (2) comprises an image-carrying member which can be moved cyclically. The image-carrying member may be an image-forming or an image-receiving member. The image-carrying member is an endless member, e.g. a drum or belt, and may have a layered structure. A number of process colours (6) are available on the printing unit. Responsive to a sequence of printing signals, the printing unit sequentially forms the respective separation images of marking particles of the corresponding process colour on the image-carrying member. The printing unit is such that the respective separation images of marking particles are formed complementary. This means that marking particles of a process colour are accumulated on the free surface of the image-carrying member and substantially not on coloured marking particles already accumulated on the image-carrying member. 'Substantially not' means that any superimposed marking particles of different process colours may not lead to visual deficiencies, i.e. being visual with the naked human eye, in the finally printed image. After the formation of the registered multi-colour image, the printing unit subsequently transfers the multi-colour image of marking particles, optionally via one or more intermediate members, to a medium where it may be fixed simultaneously or thereafter. This medium can be in web or sheet form and may be composed of e.g. paper, cardboard, label stock, plastic or textile. The intermediate member may be an endless member, such as a belt or drum, which can be moved cyclically. The transfer to the medium or the intermediate member can be by means of pressure, or pressure and heat. Depending on the nature and resistivity of the marking particles, the transfer may be assisted electrostatically and/or magnetically and/or by means of a vibration force, e.g. sonically. An example of such a printing unit is disclosed in European Patent Application Publication No. EP 373704 A1 (Van Stiphout et al), which is hereby incorporated by reference. In that disclosure, the image-carrying member is a cylindrical drum having an outer layer of silicone rubber. Another example is disclosed in U.S. Pat. No. 6,352,806 (Dalal) where the image-carrying member is a belt having a photo-conductive outer layer.

With reference to the drawings, by means of example it will be now described how a digital multi-colour image can be reproduced by means of the digital colour image reproduction system of FIG. 1. Suppose for instance that an original multi-colour image is scanned at a resolution of 600 dpi×600 dpi resulting in a digital multi-colour image being composed of three separation images respectively of the colours red (R), green (G) and blue (B). The image signals associated with the respective separation images specify for each pixel of the respective colour an image density value using an 8-bit representation. An 8-bit representation enables to define 256 levels each corresponding with a particular tonal value. This digital multi-colour image is forwarded to the image processing system of a complementary digital colour image reproduction system provided with the KRGBCMY process colours. These process colours are specifically adapted for use in a complementary image reproduction system and defined in the CIE-L*a*b* colour space (see Table 1) for a D50 light source and uncoated white paper.

The maximum achievable colour gamut is the colour gamut defined by all the available process colours. The colour processing module (7) divides the colour gamut achievable with these seven process colours on the digital image reproduction system into all obtainable sub-gamuts defined by three chromatic process colours. This yields the following sub-gamuts: RYG, RYC, RYB, RYM, RGC, RGB, RGM, RCB, RCM, RBM, YGC, YGB, YGM, YCB, YCM, YBM, GCB, GCM, GBM, CBM.

TABLE 1

| Process colour | L* (lightness) | a* | b* |
|---|---|---|---|
| Blue | 29 | 18 | −54 |
| Red | 50 | 54 | 41 |
| Green | 52 | −64 | 23 |
| Cyan | 48 | −26 | −36 |
| Magenta | 52 | 64 | −23 |
| Yellow | 90 | −8 | 92 |

However, primarily to avoid Moiré, only three screens may be used to render the chromatic process colours. When processing neighbouring or nearby pixels of a digital colour image, these pixels may slightly differ in colour but the difference may nevertheless be enough to locate them in different sub-gamuts. For instance a first pixel may be located in the GRC(K) sub-gamut, while a second pixel is located in the adjacent YGR(K) sub-gamut. The YGR(K) and the GRC(K) sub-gamuts have two chromatic process colours in common. It is thus advantageous to associate each chromatic process colour uniquely with a single screen regardless of the sub-gamut. Preferably in order not to reduce the available colour gamut, it is advantageous to distribute the process colours uniformly over the available screens. By doing so for neighbouring or nearby pixels the transition from one sub-gamut to another adjacent sub-gamut may be effected without a significant visible effect as two out of three chromatic colours are the same and are rendered with the same screens.

The limitation to use maximum three screens for printing chromatic process colours and the fact that each process colour is to be uniquely associated with a single screen while distributing the process colours uniformly over the available screens imply a reduction in the total number of sub-gamuts which can be selected by the colour processing module.

Figure 2:
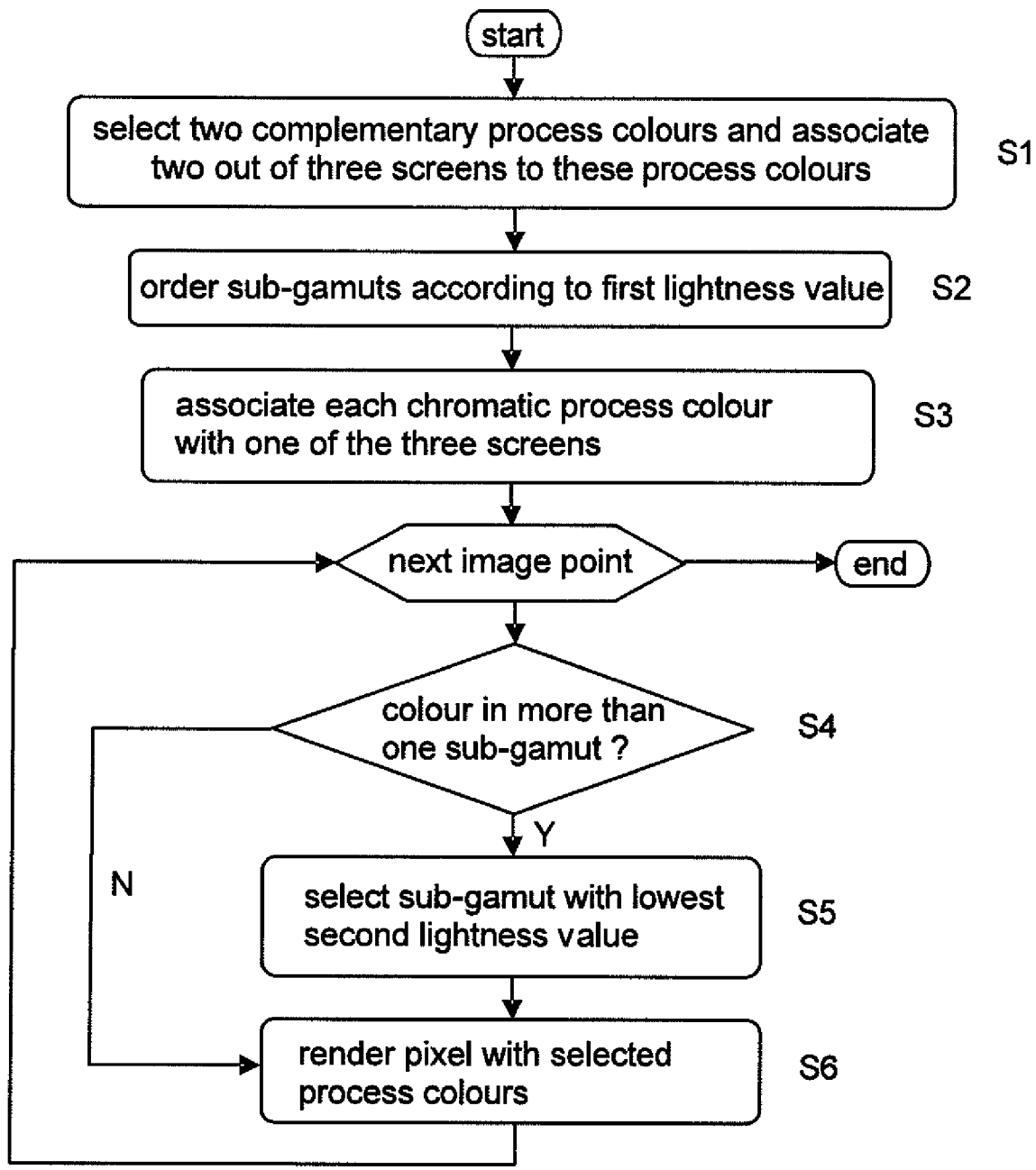
FIG. 2 is a flowchart for explaining a method for processing a digital multi-colour image according to an embodiment of the present invention.

The unique association of the respective chromatic process colours with the three screens is now further explained according to the present invention referring to FIG. 2. As R and C, G and M, and Y and B are complementary colours, there are plenty of segments comprising complementary chromatic process colours. We have observed experimentally that the most pleasant grey tone is produced employing the complementary process colours red and cyan. Therefore, the sub-gamuts comprising these process colours are determined to be: RCM, RCB, RCY and RCG (step S1). Subsequently, these four sub-gamuts are ordered with increasing first lightness value (step S2). The first lightness value of a sub-gamut is the maximum of the lightness differences between the respective chromatic process colours defining the sub-gamut. For instance for RCM the first lightness value is four (being the difference of the lightness values of Cyan and Magenta, as in Table 1), while for RCB the first lightness value is twenty-one (being the difference between the lightness values of Red and Blue, as in Table 1). This yields the following order: RCM, RCG, RCB, RCY.

Then, based on this lightness order, each of the respective chromatic process colours is associated with a single one of three different screens (step S3). By preference, process colours that are positioned adjacent to each other in the colour space, in this example CIE L*a*b*, are associated with a different screen since otherwise these process colours can not be part of the same sub-gamut which would reduce the colour gamut.

Starting with the sub-gamut with the lowest first lightness value RCM, for instance the first screen may be used to process Red, the second screen may be used to process Cyan, and the third screen may be used to process Magenta. As all process colours of the RCM sub-gamut are associated with a screen, we proceed to the subsequent sub-gamut based on the first lightness value order. This is the RCG sub-gamut. The only process colour not yet associated is Green. Green is associated with the only available screen, being screen 3 in this example. To distribute the process colours uniformly over the available screens, the remaining process colours Yellow and Blue are to be associated with screen 1 and screen 2. By preference, as Red and Yellow are process colours that are positioned adjacent to each other in the colour space, Blue is associated with screen 1, while Yellow is associated with screen 2.

Based on the screen association the twenty sub-gamuts listed above, are reduced to eight sub-gamuts being RYG, RYM, RGC, RCM, YGB, YBM, GCB, CBM, which in total cover the complete colour gamut determined by all six chromatic process colours and additionally black.

For each of these remaining sub-gamuts an associated second lightness value, which is in this example the lightness difference in the CIE L*a*b* colour space between the two chromatic process colours of the sub-gamut defining a plane positioned closest to the lightness axis, is determined. For instance, for the sub-gamut RYG, the two chromatic process colours defining the plane positioned closest to the lightness axis are Red and Green. The (absolute) lightness difference between these two colours (see Table 1) equals two, thus the second lightness value for the sub-gamut RYG equals two. For the sub-gamut YGB, the two chromatic process colours defining the plane positioned closest to the lightness axis are Yellow and Blue. The (absolute) lightness difference between these two colours (see Table 1) equals 61, thus the second lightness value for the sub-gamut YGB equals 61. The second lightness value can subsequently also be determined for the other six remaining sub-gamuts RYM, RGC, RCM, YBM, GCB, CBM.

From the eight remaining sub-gamuts, the colour processing module (7) determines for each point in the colour space (in this example CIE L*a*b*) those sub-gamuts which contain that point. If the point is contained in more than one sub-gamut, then, based on the second lightness value the colour processing module selects for that point one corresponding sub-gamut (steps S4 and S5). With known techniques a colour management system may be used to map and/or match each pixel of a digital image with a point in this CIE L*a*b* colour space. Thus each pixel can be rendered using up to three out of the six available chromatic process colours and optionally black (step 6).

For example, suppose a point is contained in two sub-gamuts, e.g. the RYG and the YGB sub-gamut. As the second lightness value of the RYG sub-gamut, being 2, is much lower than that of the YGB sub-gamut, being 61, for this point the RYG sub-gamut will be selected by the colour processing module. Suppose for instance that a pixel of the digital image is mapped and optionally matched on this point, then the image signal generation module (8) of the image processing system converts the three image signals associated with the separation images of the RGB colours into three image signals associated with the separation images of the selected chromatic process colours, being RYG. In practice, image signals may be generated for all process colours (KRGB-CMY) but the image density values for the colours KBCM will be zero for this pixel as these process colours are not part of the selected sub-gamut.

Further to this example the halftoning (also referred to as screening) technique used to convert the RYG image signals into a corresponding RYG printing signals is a binary matrix-dither technique. The halftoning is performed using only up to three screens for the chromatic colours, each having a predetermined screen angle. R is screened using screen 1, Y is screened using screen 2 and G is screened using screen 3. Each screen is a repetitive pattern of a predetermined matrix structure defining cells with associated image density threshold values. The matrix structure may differ for the respective screens. The size of each cell usually corresponds to the minimum image dot size which can be rendered by the printing unit. A printing signal associated with a separation image of a process colour is generated by comparing the image density value for that process colour for each pixel with a corresponding cell of the selected screen. If the image density value for that process colour for the pixel is equal to or higher than the threshold value of the corresponding cell, the printing signal indicates that an image dot of marking particles of that process colour is to be formed. If the image density value for that process colour for that pixel is below the threshold value, the printing signal indicates that no image dot of marking particles of that process colour is to be formed.

Further according to the present invention, the process colours as defined in Table 1, which are specifically adapted for use in a complementary image reproduction system can be replaced by other process colours such as for instance the ones defined in Table 2. These process colours are typical colours used in offset printing and are defined in the CIE-L*a*b* colour space (see Table 1) for a D50 light source and uncoated white paper according to ISO-standard 12647-2. It is observed that the method according to present invention is also applicable when using these non-dedicated process colours.

TABLE 2

| Process colour | L* (lightness) | a* | b* |
|---|---|---|---|
| Blue | 38 | 12 | −28 |
| Red | 51 | 53 | 22 |
| Green | 52 | −38 | 17 |
| Cyan | 62 | −23 | −39 |
| Magenta | 53 | 56 | −2 |
| Yellow | 86 | −4 | 68 |

The processing steps (e.g., processes of the modules in FIG. 1) of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for processing a digital multi-colour image for reproduction thereof on a complementary colour image reproduction system provided with a plurality of process colours defining a gamut, the method comprising the steps of:

dividing the gamut into a plurality of sub-gamuts, each sub-gamut being defined by three chromatic process colours of the plurality of process colours, such that at least one sub-gamut of the plurality of sub-gamuts comprises complementary process colours;

selecting two complementary process colours, determining for each sub-gamut comprising the selected complementary process colours an associated first lightness value, which is the maximum of the lightness differences between the respective chromatic process colours defining the sub-gamut, ordering all sub-gamuts comprising the selected complementary process colours according to increasing first lightness value, and based on this lightness order associating each of the respective chromatic process colours with a single one of three different screens;

determining for each sub-gamut of the plurality of sub-gamuts an associated second lightness value, which is the lightness difference in a predetermined colour space between the two chromatic process colours of the sub-gamut defining a plane positioned closest to the lightness axis; and determining for each pixel of the digital multi-colour image the sub-gamuts which can be used for rendering the corresponding pixel, selecting a sub-gamut with the lowest associated second lightness value among the determined sub-gamuts, and rendering the pixel with at most three chromatic process colours of the three chromatic process colours defining the selected sub-gamut, wherein each step is performed using a colour processing module of the colour image reproduction system.

2. The method as recited in claim 1, wherein process colours being positioned adjacent to each other in the predetermined colour space are each associated with a different screen.

3. The method as recited in claim 1, wherein the complementary process colours are screened with a different screening angle.

4. The method as recited in claim 1, wherein the complementary colour image reproduction system is provided with six chromatic colours.

5. The method as recited in claim 4, wherein the six chromatic colours are red, green, blue, cyan, magneta and yellow.

6. The method as recited in claim 1, wherein in the selecting step, the selected two complementary colours are cyan and red.

7. The method as recited in claim 1, wherein each sub-gamut is defined by at least one additive primary process colour and at least one subtractive secondary process colour.

8. An image processing system for processing a digital multi-colour image for reproduction thereof in a complementary colour image reproduction system provided with a plurality of process colours defining a gamut, the image processing system comprising:

means for dividing the gamut into a plurality of sub-gamuts, each sub-gamut being defined by three chromatic process colours of the plurality of process colours, such that at least one sub-gamut of the plurality of sub-gamuts comprises complementary process colours;

means for selecting two complementary process colours, determining for each sub-gamut comprising the selected complementary process colours an associated first lightness value, which is the maximum of the lightness differences between the respective chromatic process colours defining the sub-gamut, ordering all sub-gamuts comprising the selected complementary process colours according to increasing first lightness value, and based on this lightness order associating each of the respective chromatic process colours with a single one of three different screens;

means for determining for each sub-gamut of the plurality of sub-gamuts an associated second lightness value, which is the lightness difference in a predetermined colour space between the two chromatic process colours of the sub-gamut defining a plane positioned closest to the lightness axis; and means for determining for each pixel of the digital multi-colour image the sub-gamuts which can be used for rendering the corresponding pixel, selecting a sub-gamut with the lowest associated second lightness value among the determined sub-gamuts, and rendering the pixel with at most three chromatic process colours of the three chromatic process colours defining the selected sub-gamut.

9. The image processing system as recited in claim 8, wherein process colours being positioned adjacent to each other in the predetermined colour space are each associated with a different screen.

10. The image processing system as recited in claim 8, wherein the complementary process colours are screened with a different screening angle.

11. The image processing system as recited in claim 8, wherein the complementary colour image reproduction system is provided with six chromatic colours being red, green, blue, cyan, magenta and yellow.

12. The image processing system as recited in claim 8, wherein the selected two complementary colours are cyan and red.

13. The image processing system as recited in claim 8, wherein each sub-gamut is defined by at least one additive primary process colour and at least one subtractive secondary process colour.

14. A computer program embodied on at least one computer-readable medium, for processing a digital multi-colour image for reproduction thereof on a complementary colour image reproduction system provided with a plurality of process colours defining a gamut, the program comprising computer-executable instructions for:

dividing the gamut into a plurality of sub-gamuts, each sub-gamut being defined by three chromatic process colours of the plurality of process colours, such that at least one sub-gamut of the plurality of sub-gamuts comprises complementary process colours;

selecting two complementary process colours, determining for each sub-gamut comprising the selected complementary process colours an associated first lightness value, which is the maximum of the lightness differences between the respective chromatic process colours defining the sub-gamut, ordering all sub-gamuts comprising the selected complementary process colours according to increasing first lightness value, and based on this lightness order associating each of the respective chromatic process colours with a single one of three different screens;

determining for each sub-gamut of the plurality of sub-gamuts an associated second lightness value, which is the lightness difference in a predetermined colour space between the two chromatic process colours of the sub-gamut defining a plane positioned closest to the lightness axis; and determining for each pixel of the digital multi-colour image the sub-gamuts which can be used for rendering the corresponding pixel, selecting a sub-gamut with the lowest associated second lightness value among the determined sub-gamuts, and rendering the pixel with at most three chromatic process colours of the three chromatic process colours defining the selected sub-gamut.

15. The computer program as recited in claim 14, wherein process colours being positioned adjacent to each other in the predetermined colour space are each associated with a different screen.

16. The computer program as recited in claim 14, wherein the complementary process colours are screened with a different screening angle.

17. The computer program as recited in claim 14, wherein the complementary colour image reproduction system is provided with six chromatic colours being red, green, blue, cyan, magenta and yellow.

18. The computer program as recited in claim 14, wherein the selected two complementary colours are cyan and red.

19. The computer program as recited in claim 14, wherein each sub-gamut is defined by at least one additive primary process colour and at least one subtractive secondary process colour.

* * * * *